(12) United States Patent
McAllister et al.

(10) Patent No.: US 7,747,694 B2
(45) Date of Patent: Jun. 29, 2010

(54) LOW LATENCY AND ASSURED DELIVERY USING HTTP

(75) Inventors: Shawn McAllister, Manotick (CA); George Joseph Bertin, Carp (CA); David George McKay, Ottawa (CA)

(73) Assignee: Solace Systems, Inc., Kanata, ON (CA)

( * ) Notice: Subject to any disclaimer, the term of this patent is extended or adjusted under 35 U.S.C. 154(b) by 313 days.

(21) Appl. No.: 11/830,280

(22) Filed: Jul. 30, 2007

(65) Prior Publication Data

US 2009/0037518 A1 Feb. 5, 2009

(51) Int. Cl.
*G06F 13/00* (2006.01)
(52) U.S. Cl. .................. 709/206; 709/219; 709/228
(58) Field of Classification Search .......... 709/217, 709/219, 223, 224, 227, 228, 229, 206
See application file for complete search history.

(56) References Cited

U.S. PATENT DOCUMENTS

| | | | | |
|---|---|---|---|---|
| 6,789,119 | B1 * | 9/2004 | Zhu et al. ............ | 709/227 |
| 7,577,749 | B1 * | 8/2009 | Long ................. | 709/230 |
| 2003/0093585 | A1 * | 5/2003 | Allan ................ | 709/330 |
| 2007/0203995 | A1 * | 8/2007 | Wang et al. ........... | 709/206 |

OTHER PUBLICATIONS

SOAP Version 1.2 Part ): PrimerW3C Recommendation Jun. 24, 2003 (MIT, ERCIM, Keio) All rights reserved.
SOAP Version 1.2 Specification Errata W3C Errata for SOAP Version 1.2 part 0: Primer.

* cited by examiner

*Primary Examiner*—Viet Vu
(74) *Attorney, Agent, or Firm*—Marks & Clerk; Richard J. Mitchell

(57) ABSTRACT

In a method of performing the asynchronous delivery of messages from a server to a client, the server receives the messages for the client from a message source. The server and client communicate over a packet network using an asymmetric protocol that requires request messages to be originated from the client to the server. At least one request message is sent in advance from the client to the server, and these request messages are stored at the server. When the server receives a message for the client from the message source, it forwards the message to the client as a response to a stored request message.

6 Claims, 3 Drawing Sheets

```
GET http://www.mycompany.com/ImportantAlert HTTP/1.1
```
— 61

Fig. 3

```
HTTP/1.1 200 OK                              — 71
MsgID: A13B                                  — 72
MsgRedeliveryFlag: False                     — 73
Content-Type: application/xml                — 74
Content-Length: 2047                         — 75

< ?xml ...                                   — 76
-- XML message
>
```

Fig. 4

```
                                             — 81
GET http://www.mycompany.com/ImportantAlert HTTP/1.1
MsgID: A13B
                — 82
```

Fig. 5

```
HTTP/1.1 204 No Content          — 91
```

Fig. 6

LOW LATENCY AND ASSURED DELIVERY USING HTTP

FIELD OF THE INVENTION

This invention relates to data communication networks. and in particular to a method of asynchronously delivering data from a server to a client with very low latency, and to optionally provide for assured delivery of data from the server to the client, wherein the client and server communicate using an asymmetric protocol, such as Hyper Text Transfer Protocol (HTTP), that requires request messages to be originated from the client to the server.

BACKGROUND OF THE INVENTION

The Hyper Text Transfer Protocol (HTTP) as defined by the Internet Engineering Task Force (IETF) in Request For Comment (RFC) 2616 is a very widely deployed protocol for computer-to-computer communications. It is so widely supported by intermediate networking equipment such as IP firewalls and Proxies that leveraging this transport protocol for application-to-application messaging is very desirable. So much so that emerging Web Services standards defined by the World Wide Web Consortium (W3C) rely very heavily, although not exclusively, on HTTP as a transport. In fact, the SOAP specification (http://www.w3.org/TR/2003/REC-soap12-part0-20030624/) published by the World Wide Web Consortium (W3C) and the basis for Web Services, specifically calls out a method of delivering SOAP messages using HTTP—referred to as the SOAP HTTP Binding. In this specification, use of HTTP POST and HTTP GET are described for use in delivering SOAP messages. However, along with the many benefits of using HTTP for delivery of messages between applications come several limitations when what is required is asynchronous, low latency message delivery to HTTP client (rather than server) devices, optionally with assured delivery. Use of an HTTP server is less desirable than an HTTP client in some cases where the application receiving the asynchronous messaging needs to have a small RAM and CPU footprint on the end device or where the application's IP address needs to be dynamically assigned rather than fixed, or where the application is behind an IP firewall and thus not allowed to accept incoming TCP connections due to security concerns. The fact that it is desirable to have (a) an HTTP client application (b) receive asynchronous messages with low latency and optionally in an assured manner is what causes the problem because HTTP is an asymmetric protocol inherently designed for request-response style message exchange patterns with the HTTP client initiating the request-response exchange. In this case, what is required is that the message exchange actually be initiated by the HTTP server application. Web Services standards and the like resolve the issue of low latency asynchronous messaging by having the receiving application be an HTTP server to which the source of asynchronous messages (acting as an HTTP client) sends HTTP POST messages, which is the opposite of what is required in this use case for reasons explained above. Alternatively, the HTTP Client wishing to receive messages can send an HTTP GET message periodically to the HTTP Server to poll for messages to be received as described in the SOAP specification. However, this polling mechanism either introduces too much delay in message delivery for some applications, or results in excessive network traffic if the polling rate is reduced. Also, there is no mechanism for providing assured delivery of messages to the receiving application—where the sending HTTP server can be sure that the receiving application has indeed received and processed the message. Even with use of TCP, the underlying transport protocol for HTTP, to guard against packet loss in the underlying IP network, it is possible for an HTTP Server to send data into the TCP connection and have the receiving HTTP Client fail or for connectivity to be lost, resulting in the HTTP Client not receiving the message without the knowledge of the HTTP Server. It is the aim of this invention to resolve these limitations in the current use of HTTP in order to provide an asynchronous, low latency delivery mechanism from an HTTP server to an HTTP client with optional assured delivery of messages.

SUMMARY OF THE INVENTION

According to the present invention there is provided a method of performing the asynchronous delivery of messages from a server to a client, wherein the server receives said messages for the client from a message source, and the server and client communicate over a packet network using an asymmetric protocol that requires request messages to be originated from the client to the server, comprising sending at least one said request message in advance from the client to the server; storing said at least one request messages at the server; and when the server receives a said message for the client from said message source, forwarding said message to said client as a response to a stored said request message.

The asymmetric protocol is typically HTTP, although other similar protocols could be employed. In this embodiment, the invention comprises a method by which an HTTP client receives asynchronous, low latency messages, optionally with assured delivery of these messages. In this embodiment, the invention makes use of HTTP GET which is sent by the HTTP client (the receiver of asynchronous messages) to the HTTP server (the sender of asynchronous messages), but which the HTTP server does not reply to until either a message arrives for asynchronous delivery or until a specified timeout has occurred. Use of HTTP/1.1 pipelining, typically used with POST messages, allows a window of message delivery to be opened at the HTTP layer between the client and the server to ensure concurrent message delivery, thereby improving performance. Finally, assured delivery of messages is accomplished by exchanging a message identifier for each message from the server to the client in the HTTP GET response (when the message is delivered) and receipt of the message is acknowledged by the HTTP Client returning this message identifier to the HTTP Server in a subsequent HTTP GET request.

BRIEF DESCRIPTION OF THE DRAWINGS

The invention will now be described in more detail by way of example with reference to the accompanying drawings in which:

FIG. 3 illustrates an example of a pipelined HTTP GET request sent by an HTTP Client to an HTTP Server;

FIG. 4 depicts an example HTTP GET response returned from the HTTP Server to the HTTP Client;

FIG. 5 contains an example HTTP GET request sent from the HTTP Client to the HTTP Server;

FIG. 6 contains an example HTTP GET reply for a keepalive message; and

DETAILED DESCRIPTION OF THE PREFERRED EMBODIMENTS

Figure 1:
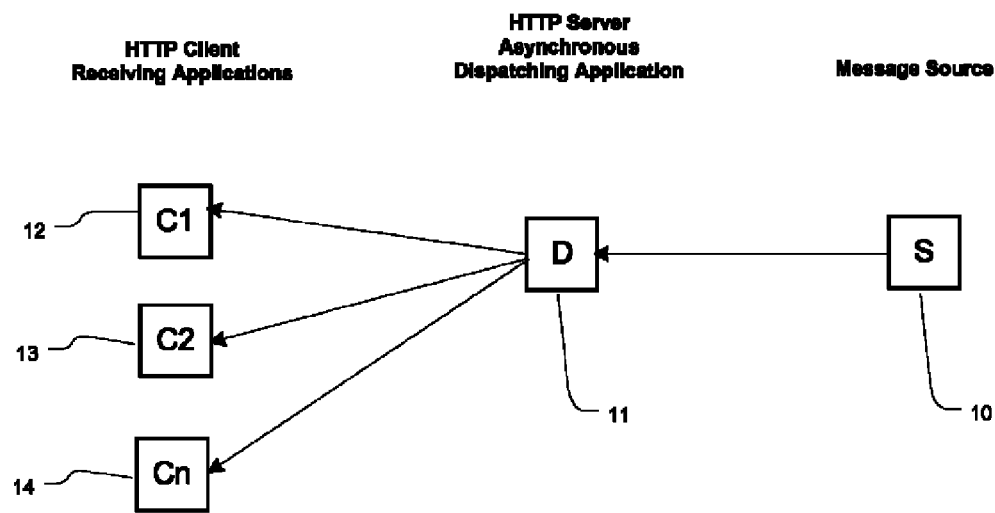
FIG. 1 depicts the general message delivery scenario applicable to embodiments of this invention.

FIG. 1 depicts the general message delivery scenario applicable to this invention. In FIG. 1, a message source 10 asynchronously sends messages to an HTTP Server 11 to then be delivered to one or more HTTP client applications 12-14 based on some message routing rules. In the simpler form, message source 10 and HTTP Server 11 could in fact be the same application delivering messages based on some criteria to one or more HTTP client applications 12-14. The message source 10 and HTTP server 11 are applications typically implemented in software on general purpose computing platforms although other implementations are also possible. The HTTP clients 12-14 are also typically software applications running on general purpose computing platforms that are separate from the HTTP Server's computing platform and in fact typically not co-located with the HTTP Server application, but rather reachable over an Internet Protocol (IP) network, through a variety of communication links, IP routers, layer 2 switches, firewalls, and other such devices commonly found in telecommunication networks.

HTTP Server 11 and the HTTP clients 12-14 implement their respective portions of the HTTP protocol defined in Request for Comment (RFC) 2616 from the Internet Engineering Task Force, the contents of which are included by reference. As such, HTTP client 12 first establishes a Transmission Control Protocol (TCP) connection to HTTP Server 11 as described in Request for Comment (RFC) 793 from the Internet Engineering Task Force, the contents of which are incorporated by reference. In this manner, HTTP Client 12 has more flexible implementation and deployment options in that it may have a dynamically assigned IP address, or may be behind a firewall that precludes incoming connections, or can be a device that does not have the resources required to implement a complete HTTP server.

Following TCP connection establishment, HTTP Client 12 may then identify itself to and potentially authenticate itself with HTTP Server 11. This may be done, for example, using HTTP Basic Authentication as described in RFC 2617 from the Internet Engineering Task Force, the contents of which are incorporated by reference, although other mechanisms are also possible. In this case, the HTTP Client 12 provides username and password credentials to identify and authenticate itself to the HTTP Server 11. The purpose of doing so is to facilitate routing of the appropriate messages by HTTP Server 11 to the correct HTTP Client, as identified by its username. Many methods can be employed for routing such messages without altering the applicability of this invention. Having established a communications channel, HTTP Client 12 is ready to initiate the message exchanges that allow it to asynchronously receive messages from HTTP Server 11 with low latency.

A summary of the message delivery mechanism is as follows: As explained earlier, HTTP is an asymmetric protocol that requires that all HTTP messages be originated from the HTTP Client to the HTTP Server. Asynchronous messages from the HTTP Server to the HTTP Client are not supported. As such, this invention prescribes that the HTTP Client 12 send an HTTP GET request message to the HTTP Server 11, but that the HTTP Server 11 not reply to this message until either a message is ready for delivery or until a prescribed time has elapsed. This is different from the typical use of HTTP where a response to the HTTP GET request is returned as soon as the item identified by the Universal Resource Identifier (URI) of the HTTP GET is accessed. Furthermore, the pipelining feature of HTTP/1.1 is used to send several HTTP GET requests in series from the HTTP Client 12 to the HTTP Server 11 in order to effectively grant credits for or allow delivery of several messages concurrently, each in its own HTTP GET response. This mechanism results in increased concurrency and decreased overall message delivery latency. As messages are received by the HTTP Client 12, it re-sends an HTTP GET request to the HTTP Server 11 to replenish the message delivery credits. The key to low latency is to ensure that there is always at least one HTTP GET held by the HTTP Server on behalf of the HTTP Client.

Figure 2:
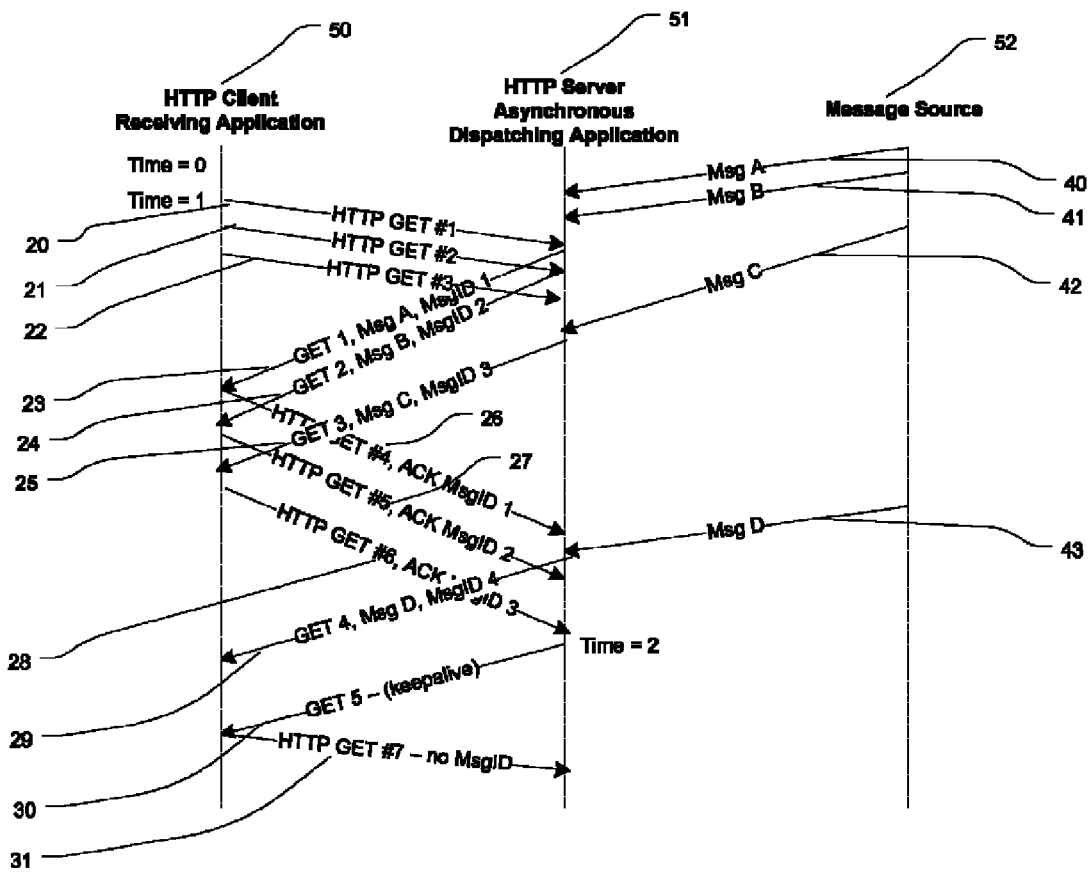
In FIG. 2 depicts an example message sequence diagram associated with embodiments of this invention.

FIG. 2 depicts an example message sequence diagram associated with an embodiment of this invention. At Time=1, the TCP connection between the HTTP Client 50 and the HTTP Server 51 has been established and any required authentication and authorization has been performed. In this particular example, the HTTP Client 50 issues three pipelined HTTP GET requests 20-22 to the HTTP Server 51. More or fewer HTTP GET requests can be sent depending on how large of a message delivery window is required for a particular application. By the time HTTP GET #1 arrives at the HTTP Server 51, messages Msg A and Msg B 40-41 are waiting at the HTTP Server 51 for delivery to the HTTP Client 50. Therefore, Msg A 40 is returned in an HTTP GET reply 23 created immediately by HTTP Server 51 in response to receiving HTTP GET #1 20. Likewise, as soon as HTTP GET #2 21 is received by the HTTP Server 51, Msg B 41 is returned in an HTTP GET reply 24. When HTTP GET #3 22 is received by the HTTP Server 51, there are no messages for deliver, so HTTP Server 51 holds HTTP GET #3 22 and does not reply. Shortly after this, HTTP Server 51 receives Msg C 42 destined for HTTP Client 50. As a result, a reply 25 is issued for HTTP GET #3 containing Msg C 42. Note that in this case, Msg C 42 can be delivered immediately and with low latency to the HTTP Client 50 without needing to wait for the HTTP Client 50 to poll the HTTP Server 51 by sending another HTTP GET request.

Following on in FIG. 2, as the HTTP GET response 23 containing Msg A 40 is received by the HTTP Client 50, the message can be processed by the HTTP Client who then also replenishes the delivery window by sending HTTP GET #4 request 26 to the HTTP Server. Similarly upon receiving HTTP GET response #2 24 containing Msg B 41, the HTTP Client can process Msg B 41 and replenishes the delivery window by sending HTTP GET #5 27 to the HTTP Server. Finally, the same processing occurs when the HTTP Client receives HTTP GET response #3 25 containing Msg C 42, where it processes the message and then replenishes the delivery window by sending HTTP GET #6 28. Continuing with the processing in FIG. 2, the Message Source 52 sends another message Msg D 43 to HTTP Server 51 for distribution. Since HTTP Server 51 has received several HTTP GET requests to which it has not replied, it creates an HTTP GET reply #4 29, encapsulates Msg D 43 and sends it to HTTP Client 50. Note again that this can be done with very low latency due to the queued HTTP GET request held by the HTTP Server 51. Following delivery of Msg D 43, a sufficiently long period of time elapses without any messages arriving at HTTP Server 51 to be delivered to HTTP Client 50. Therefore, at Time=2, HTTP Server 51 sends a "keepalive" message 30 back to HTTP Client 50. This keepalive message is in the form of an empty HTTP GET reply. The purpose of the keepalive message is to ensure that traffic is flowing periodically over the TCP connection in order to allow detection of a failed TCP connection. If the HTTP Client 50 does not receive a valid message or a keepalive message within an agreed period of time it considers the TCP connection to have failed and will re-establish a new connection. Again, in response to receiving the keepalive message 30, the HTTP Client replenishes the message delivery window by sending HTTP GET #7 31 to the HTTP Server 51. This completes the description of the low latency delivery mechanism.

Message delivery from the HTTP Server 51 to the HTTP Client 50 can be given a higher degree of reliability by using an assured delivery mode of operation. Assured delivery is a mode of delivery common in message systems which ensures that a message is reliably delivered to the target application even in the face of various failures in the delivery systems, such as the failure of the HTTP Server process 51 for example. Assured delivery is accomplished by having the HTTP Client 50 acknowledge receipt of each message back to the HTTP Server 51. In order to do so, each message delivered in an HTTP GET reply from the HTTP Server 51 contains a unique message identifier—MsgID, shown as 23, 24, 25, 29 in FIG. 2. Upon receiving a message in an HTTP GET reply, the HTTP Client 50, replenishes its message delivery window with another HTTP GET request as described previously, and also returns in the HTTP GET request this same MsgID value to the HTTP Server 51 in order to acknowledge receipt of this particular message. This allows the HTTP Server 51 to consider that particular message successfully delivered and to therefore delete it from its list of outstanding messages to that HTTP Client. Messages may be stored by the HTTP Server in volatile memory such as RAM or could be stored in non-volatile memory such as a hard disk to guard against loss in the event of failure of the HTTP Server 51. If the HTTP connection to an HTTP Client were to terminate for any reason, then any unacknowledged messages queued to that HTTP Client would not be deleted and in fact would be redelivered to the HTTP Client when the connection is re-established. This would be the case even for messages that were transmitted to the HTTP Client in an HTTP GET reply but for which no acknowledgement of receipt (in the form of an HTTP GET request with the corresponding MsgID) was received by the HTTP Server. In the case where a message was already sent to the HTTP Client by the HTTP Server when the TCP connection failed, it is not possible for the HTTP Server to know whether the HTTP Client received the message, and the acknowledgement was lost, or whether the original message was in fact never received by the HTTP Client. In the former case, when the message is resent by the HTTP Server, it will appear to the HTTP Client as a duplicate message. In order to indicate this potential duplication of message delivery, the HTTP Server may set a flag in the HTTP GET reply of the redelivered message to indicate a potential redelivery. This type of redelivery indication is common in many existing messaging systems, such as the Java Messaging Service from Sun, incorporated herein by reference.

Examples of HTTP messages for this invention are shown in FIG. 3 to FIG. 6.

FIG. 3 is an example of a pipelined HTTP GET request sent by an HTTP Client to an HTTP Server once the HTTP connection is established. In order to send more than one request without receiving a response (pipelined requests), HTTP1.1 must be signaled in the HTTP request. The URI 61 used in the request, http://www.mycompany.com in this example, is the URI identifying the message delivery service.

FIG. 4 depicts an example HTTP GET response returned from the HTTP Server to the HTTP Client carrying a message payload to be delivered. In this example, the payload 76 is an XML message as indicated by the Content-Type field 74 in the reply. Many other content encoding types are supported by HTTP and can be transported in the message payload. The Content-Length field 75 is used to indicate the size of the message payload being delivered. The MsgID field 72 contains the identifier of this particular message as assigned by the HTTP Server. This identifier is to be returned by the HTTP Client to the HTTP Server to acknowledge receipt of this particular message in order to provide an assured delivery service. The MsgRedeliveryFlag 73 indicates whether this message is being retransmitted to the HTTP Client and whether it could therefore be a duplicate message from the point of view of the HTTP Client. The overall return code is indicated by the 200 OK code 71 of the HTTP reply header.

FIG. 5 contains an example HTTP GET request sent from the HTTP Client to the HTTP Server to both replenish the message delivery window as well as to acknowledge receipt of the message identified by the MsgID field 82 for assured delivery mode. The URI of the message delivery service to which this GET is directed is indicated in field 81.

FIG. 6 contains an example HTTP GET reply for a keepalive message. The return code of 204 No Content 91 is what indicates to the HTTP Client that there is no message payload in this HTTP GET reply but rather that it is a keepalive message. In response to this keepalive message, the HTTP Client replenishes the message delivery window without acknowledging any message delivery by sending an HTTP GET as shown in FIG. 3 to the HTTP Server.

Figure 7:
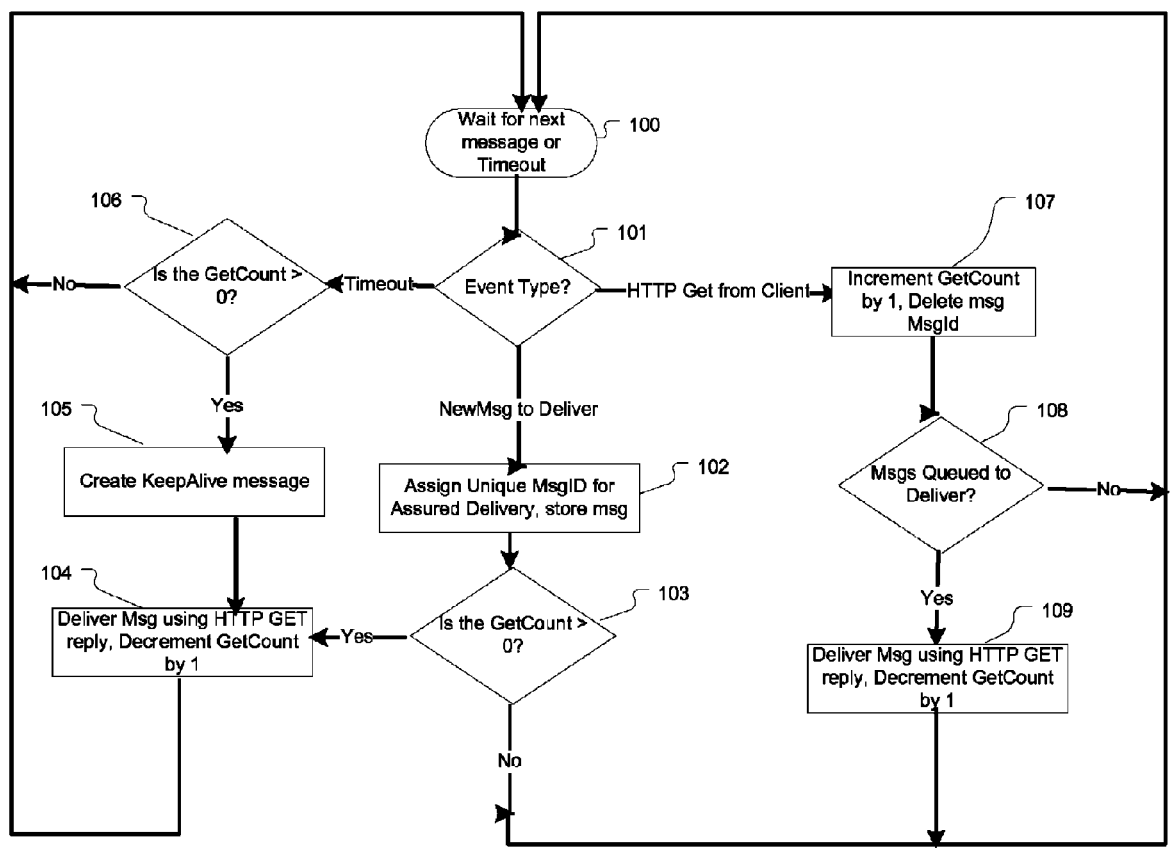
FIG. 7 illustrates an example algorithm executed by the HTTP Server to effect low latency message delivery over HTTP with optional assured delivery.

An example algorithm executed by the HTTP Server to effect low latency message delivery over HTTP with optional assured delivery is shown in FIG. 7. Initially, the HTTP Server waits for some type of event at step 100. This event can be a new message to deliver, an HTTP GET request from the HTTP Client or a timeout event. Upon receiving the event, HTTP Server proceeds to examine the event at decision point 101. If the event is a new message to deliver, it proceeds to processing step 102 where it assigns a unique MsgID, if assured delivery is being used, and it stores the message either in RAM or on hard disk as required. It then proceeds to decision point 103 to determine if there are any queued HTTP GET requests which can be used to carry messages back to the client by checking variable GetCount. If there are no queued GET requests, then this newly arrived message remains queued and the algorithm returns to wait for the next event at step 100.

Alternatively, if there is one or more HTTP GET messages queued, then the algorithm proceeds to step 104 where an HTTP GET reply is created and returned to the HTTP Client and the GetCount variable is decremented by one. The algorithm then returns to step 100 to wait for the next incoming event. If at decision point 101 the event is found to be a timeout, then processing proceeds to step 106 where the number of queued HTTP GETs is checked. If there are GETs queued, then processing continues to step 105 where a keepalive message is created. Next at step 104 the keepalive message is sent and the GetCount is decremented by one.

Finally, if at decision point 101 the event is found to be an HTTP GET request from the client, then processing proceeds to step 107. At step 107, the GetCount variable is incremented by one and the message identified by the MsgID parameter in the GET is considered acknowledged and is therefore deleted from the list of messages queued to this Client, if assured delivery mode is being used. Processing then continues to decision point 108. If there are no messages queued awaiting delivery, then the algorithm proceeds to step 100 to wait for the next event. If there is a message queued, processing continues to step 109 where the queued message is delivered and the GetCount variable is decremented by one. The algorithm then proceeds to step 100 to wait for the next event.

It will be appreciated that an exemplary embodiment of the invention has been described, and persons skilled in the art will appreciate that many variants are possible within the scope of the invention.

All references mentioned above are herein incorporated by reference

We claim:

1. A method of performing the asynchronous delivery of messages from a server to a client, wherein the server receives said messages for the client from a message source, and the server and client communicate over a packet network using HTTP protocol, comprising:

establishing a TCP connection between the client and server;

sending a group of GET requests in advance from the client to the server in a pipelined manner over the TCP connection;

storing at least one said GET request at the server to maintain message delivery credits at the server; and when the server receives a said message for the client from said message source, forwarding said message to said client as a reply to a stored said GET message;

sending further GET requests to the server in response to receipt of messages from the server to replenish delivery credits maintained at the server;

assigning a unique message identifier to each message contained in a GET reply sent to the client; and returning the unique message identifier of a particular message received in a GET reply to the server in the further GET request sent to the server to replenish the delivery credits in response to the receipt of said particular GET message.

2. A method as claimed in claim 1, wherein said credits expire after a predetermined time, whereupon they are removed from said server, and a keepalive message is sent to the client in a GET reply to one of the stored GET requests.

3. A method as claimed in claim 1, wherein said TCP connection is normally maintained active, and wherein the client re-establishes the TCP connection if a said message or a keep alive message is not received from the server within a predetermined period of time.

4. A method as claimed in claim 1, wherein said messages are stored at the server until the message identifiers thereof are received back from the client to indicate that said messages have been received by the client.

5. A method as claimed in claim 4, wherein said server redelivers messages for which no acknowledgement has been receiver from the client.

6. A method as claimed in claim 5, wherein said redelivered messages are marked with a flag to indicate potential redelivery.

* * * * *